(12) United States Patent
Bell et al.

(10) Patent No.: US 8,687,149 B2
(45) Date of Patent: Apr. 1, 2014

(54) VISUAL DISPLAY UNIT ILLUMINATION

(75) Inventors: Gareth Paul Bell, Auckland (NZ); Gabriel Damon Engel, Hamilton (NZ)

(73) Assignee: Pure Depth Limited, Auckland (NZ)

( * ) Notice: Subject to any disclaimer, the term of this patent is extended or adjusted under 35 U.S.C. 154(b) by 0 days.

(21) Appl. No.: 13/438,833

(22) Filed: Apr. 3, 2012

(65) Prior Publication Data

US 2012/0307182 A1 Dec. 6, 2012

Related U.S. Application Data

(63) Continuation of application No. 10/492,624, filed as application No. PCT/NZ02/00213 on Oct. 11, 2002, now Pat. No. 8,149,353.

(30) Foreign Application Priority Data

Oct. 11, 2002 (NZ) ........................................ 514500

(51) Int. Cl.
 *G02F 1/1347* (2006.01)
(52) U.S. Cl.
 USPC .............................................. 349/77; 349/61
(58) Field of Classification Search
 USPC .............. 349/65, 61, 67, 62, 63, 113, 74, 77, 349/187, 70; 362/97.1, 97.2, 606, 611, 612, 362/615, 617, 620, 623, 626, 614
 See application file for complete search history.

(56) References Cited

U.S. PATENT DOCUMENTS

| | | | |
|---|---|---|---|
| 2,543,793 A | 3/1951 | Marks | |
| 2,961,486 A | 11/1960 | Marks | |
| 3,536,921 A | 10/1970 | Caulfield | |
| 3,605,594 A | 9/1971 | Gerritsen | |
| 3,622,224 A | 11/1971 | Wysocki et al. | |
| 3,863,246 A | 1/1975 | Trcka et al. | |
| 3,891,305 A | 6/1975 | Fader | |
| 3,918,796 A | 11/1975 | Fergason | |
| 3,940,788 A | 2/1976 | Abe et al. | |
| 3,955,208 A | 5/1976 | Wick et al. | |
| 3,992,082 A | 11/1976 | Katz | |
| 4,153,654 A | 5/1979 | Maffitt et al. | |
| 4,165,922 A | 8/1979 | Morrissy | |

(Continued)

FOREIGN PATENT DOCUMENTS

| | | |
|---|---|---|
| AU | 24806/00 | 7/2000 |
| AU | 2453800 | 8/2000 |

(Continued)

OTHER PUBLICATIONS

"Clearboard 1991-1994," http://web.media.mit.edu/.about.ishii/CB.html. (Per 37 C.F.R. 1.98(d).

(Continued)

*Primary Examiner* — Thoi Duong

(57) ABSTRACT

A method of adapting a visual unit having a first screen (10) in a first focal plane by the addition of one or more at least partially transparent display screens (20) at least partially overlapping said first screen (10) and located in focal planes distinct from said first focal plane, characterized in that an at least partially transparent emissive layer (21) is provided between said first screen (10) and at least one said additional display screen (20).

20 Claims, 7 Drawing Sheets

(56) References Cited

U.S. PATENT DOCUMENTS

| | | |
|---|---|---|
| 4,190,856 A | 2/1980 | Ricks |
| 4,239,349 A | 12/1980 | Scheffer |
| 4,281,341 A | 7/1981 | Byatt |
| 4,294,516 A | 10/1981 | Brooks |
| 4,333,715 A | 6/1982 | Brooks |
| 4,447,141 A | 5/1984 | Eisenkraft |
| 4,448,489 A | 5/1984 | Sato et al. |
| 4,472,737 A | 9/1984 | Iwasaki |
| 4,523,848 A | 6/1985 | Gorman et al. |
| 4,541,692 A | 9/1985 | Collins et al. |
| 4,613,896 A | 9/1986 | Takita et al. |
| 4,648,691 A | 3/1987 | Oguchi et al. |
| 4,649,425 A | 3/1987 | Pund |
| 4,670,744 A | 6/1987 | Buzak |
| 4,734,295 A | 3/1988 | Liu |
| 4,736,214 A | 4/1988 | Rogers |
| 4,768,300 A | 9/1988 | Rutili |
| 4,792,850 A | 12/1988 | Liptoh et al. |
| 5,032,007 A | 7/1991 | Silverstein et al. |
| 5,046,826 A | 9/1991 | Iwamoto et al. |
| 5,046,827 A | 9/1991 | Frost et al. |
| 5,086,354 A | 2/1992 | Bass et al. |
| 5,107,352 A | 4/1992 | Fergason |
| 5,112,121 A | 5/1992 | Chang et al. |
| 5,124,803 A | 6/1992 | Troxel |
| 5,132,839 A | 7/1992 | Travis |
| 5,132,878 A | 7/1992 | Carey |
| 5,261,404 A | 11/1993 | Mick et al. |
| 5,337,181 A | 8/1994 | Kelly |
| 5,367,801 A | 11/1994 | Ahn |
| 5,432,626 A | 7/1995 | Sasuga et al. |
| 5,473,344 A | 12/1995 | Bacon et al. |
| 5,537,233 A | 7/1996 | Miura et al. |
| 5,557,684 A | 9/1996 | Wang et al. |
| 5,583,674 A | 12/1996 | Mosley |
| 5,585,821 A | 12/1996 | Ishikura et al. |
| 5,589,980 A | 12/1996 | Bass et al. |
| 5,600,462 A | 2/1997 | Suzuki et al. |
| 5,689,316 A | 11/1997 | Hattori et al. |
| 5,695,346 A | 12/1997 | Sekiguchi et al. |
| 5,706,139 A | 1/1998 | Kelly |
| 5,745,197 A | 4/1998 | Leung et al. |
| 5,751,385 A | 5/1998 | Heinze |
| 5,764,317 A | 6/1998 | Sadovnik et al. |
| 5,796,455 A | 8/1998 | Mizobata et al. |
| 5,796,509 A | 8/1998 | Doany et al. |
| 5,822,021 A | 10/1998 | Johnson et al. |
| 5,825,436 A | 10/1998 | Knight |
| 5,838,308 A | 11/1998 | Knapp et al. |
| 5,924,870 A | 7/1999 | Brosh et al. |
| 5,956,180 A | 9/1999 | Bass et al. |
| 5,976,297 A | 11/1999 | Oka et al. |
| 5,990,990 A | 11/1999 | Crabtree |
| 6,005,654 A | 12/1999 | Kipfer et al. |
| 6,018,379 A | 1/2000 | Mizobata et al. |
| 6,061,110 A | 5/2000 | Hisatake et al. |
| 6,067,137 A | 5/2000 | Ohnishi et al. |
| 6,100,862 A | 8/2000 | Sullivan |
| 6,114,814 A | 9/2000 | Shannon et al. |
| 6,122,103 A | 9/2000 | Perkins et al. |
| 6,141,067 A | 10/2000 | Ikka |
| 6,147,741 A | 11/2000 | Chen et al. |
| 6,204,902 B1 | 3/2001 | Kim et al. |
| 6,239,852 B1 | 5/2001 | Oono et al. |
| 6,287,712 B1 | 9/2001 | Bulovic et al. |
| 6,300,990 B1 | 10/2001 | Yamaguchi et al. |
| 6,326,738 B1 | 12/2001 | McAndrew |
| 6,341,439 B1 | 1/2002 | Lennerstad |
| 6,351,298 B1 | 2/2002 | Mitsui et al. |
| 6,377,306 B1 | 4/2002 | Johnson et al. |
| 6,392,725 B1 | 5/2002 | Harada et al. |
| 6,412,953 B1 | 7/2002 | Tiao et al. |
| 6,443,579 B1 | 9/2002 | Myers |
| 6,504,587 B1 | 1/2003 | Morishita et al. |
| 6,512,559 B1 | 1/2003 | Hashimoto et al. |
| 6,515,881 B2 | 2/2003 | Chou et al. |
| 6,557,999 B1 | 5/2003 | Shimizu |
| 6,562,440 B1 | 5/2003 | Tsuchiya et al. |
| 6,573,961 B2 | 6/2003 | Jiang et al. |
| 6,578,985 B1 | 6/2003 | Seraphim et al. |
| 6,590,605 B1 | 7/2003 | Eichenlaub |
| 6,593,904 B1 | 7/2003 | Marz et al. |
| 6,609,799 B1 | 8/2003 | Myers |
| 6,639,349 B1 | 10/2003 | Bahadur |
| 6,679,613 B2 | 1/2004 | Mabuchi |
| 6,693,692 B1 | 2/2004 | Kaneko et al. |
| 6,771,327 B2 | 8/2004 | Sekiguchi |
| 6,812,649 B2 | 11/2004 | Kim |
| 6,816,214 B1 * | 11/2004 | Ohsumi .................... 349/65 |
| 6,845,578 B1 | 1/2005 | Lucas |
| 6,897,855 B1 | 5/2005 | Matthies et al. |
| 6,906,762 B1 * | 6/2005 | Witehira et al. ............ 349/73 |
| 6,947,024 B2 | 9/2005 | Lee et al. |
| 7,072,095 B2 | 7/2006 | Liang et al. |
| 7,205,355 B2 | 4/2007 | Liang et al. |
| 7,262,752 B2 | 8/2007 | Weindorf |
| 7,352,424 B2 | 4/2008 | Searle |
| 7,372,447 B1 | 5/2008 | Jacobsen et al. |
| 2001/0040652 A1 | 11/2001 | Hayashi |
| 2002/0027608 A1 | 3/2002 | Johnson et al. |
| 2002/0047601 A1 | 4/2002 | Shannon et al. |
| 2002/0064037 A1 | 5/2002 | Lee |
| 2002/0075211 A1 | 6/2002 | Nakamura |
| 2002/0105516 A1 | 8/2002 | Tracy |
| 2002/0154102 A1 | 10/2002 | Huston |
| 2002/0163728 A1 | 11/2002 | Myers |
| 2002/0163729 A1 | 11/2002 | Myers |
| 2003/0043106 A1 | 3/2003 | Woo |
| 2003/0132895 A1 | 7/2003 | Berstis |
| 2003/0184665 A1 | 10/2003 | Berstis |
| 2004/0012708 A1 | 1/2004 | Matherson |
| 2005/0146787 A1 | 7/2005 | Lukyanitsa |
| 2006/0103951 A1 | 5/2006 | Bell et al. |

FOREIGN PATENT DOCUMENTS

| | | |
|---|---|---|
| AU | 68219-01 | 12/2001 |
| CA | 2009960 | 9/1990 |
| CA | 2020372 | 1/1991 |
| CA | 2104294 | 8/1992 |
| CA | 2345128 | 3/2000 |
| DE | 2730785 | 1/1979 |
| DE | 19757378 | 7/1998 |
| DE | 29912074 | 11/1999 |
| DE | 19920789 | 5/2000 |
| EP | 76651 | 4/1983 |
| EP | 0 195 584 | 9/1986 |
| EP | 0 336 351 | 10/1989 |
| EP | 0389123 | 9/1990 |
| EP | 409188 | 1/1991 |
| EP | 454423 | 10/1991 |
| EP | 0573433 | 12/1993 |
| EP | 595387 | 5/1994 |
| EP | 2000/0733927 | 9/1996 |
| EP | 0802684 | 10/1997 |
| EP | 0999088 | 5/2000 |
| EP | 1 046 944 | 10/2000 |
| EP | 1 081 774 | 3/2001 |
| EP | 1 093 008 | 4/2001 |
| EP | 1116070 | 7/2001 |
| EP | 1151430 | 11/2001 |
| EP | 1 231 757 | 8/2002 |
| EP | 1271944 | 1/2003 |
| EP | 1287401 | 3/2003 |
| EP | 1923860 | 5/2008 |
| GB | 1 448 520 | 9/1976 |
| GB | 2107482 | 4/1983 |
| GB | 2312584 | 10/1997 |
| GB | 2314943 | 1/1998 |
| GB | 2347003 | 8/2000 |
| GB | 2372618 | 8/2002 |
| IL | 93472 | 11/1994 |
| JP | 49096628 | 5/1975 |
| JP | 56-007916 | 1/1981 |

(56) References Cited

FOREIGN PATENT DOCUMENTS

| | | |
|---|---|---|
| JP | 57-119389 | 7/1982 |
| JP | 60024502 | 2/1985 |
| JP | 60-103895 | 6/1985 |
| JP | 60-233684 | 11/1985 |
| JP | 60-244924 | 12/1985 |
| JP | 61-166524 | 7/1986 |
| JP | 61-200783 | 9/1986 |
| JP | 62-067094 | 3/1987 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-100898 | 5/1988 |
| JP | 63-203088 | 8/1988 |
| JP | 63-274918 | 8/1988 |
| JP | 2-262119 | 10/1990 |
| JP | 3-101581 | 4/1991 |
| JP | 3-233548 | 10/1991 |
| JP | 4-034521 | 2/1992 |
| JP | 4-034595 | 2/1992 |
| JP | 04-107540 | 4/1992 |
| JP | 5-007373 | 1/1993 |
| JP | 5-091545 | 4/1993 |
| JP | 5-142515 | 6/1993 |
| JP | 6-233328 | 8/1994 |
| JP | 63-039299 | 11/1994 |
| JP | 7006827 | 1/1995 |
| JP | 8-036375 | 3/1995 |
| JP | 8-076139 | 3/1995 |
| JP | 7-209573 | 8/1995 |
| JP | 7-222202 | 8/1995 |
| JP | 08335043 | 12/1996 |
| JP | 9-043540 | 2/1997 |
| JP | 9-096789 | 4/1997 |
| JP | 9-102969 | 4/1997 |
| JP | 9-133893 | 5/1997 |
| JP | 10-003355 | 1/1998 |
| JP | 10-105829 | 2/1998 |
| JP | 10039821 | 2/1998 |
| JP | 10-228347 | 8/1998 |
| JP | 10232304 | 9/1998 |
| JP | 10-312033 | 11/1998 |
| JP | 11-066306 | 3/1999 |
| JP | 11-205822 | 7/1999 |
| JP | 11202793 | 7/1999 |
| JP | 2000-075135 | 3/2000 |
| JP | 2000-111940 | 4/2000 |
| JP | 2000-113988 | 4/2000 |
| JP | 2000-142173 | 5/2000 |
| JP | 2001-56410 | 2/2001 |
| JP | 200142310 | 2/2001 |
| JP | 2001-215332 | 8/2001 |
| JP | 2002014772 | 1/2002 |
| JP | 2002504764 | 2/2002 |
| JP | 2002-097269 | 4/2002 |
| JP | 2002-099223 | 4/2002 |
| JP | 2002-156608 | 5/2002 |
| JP | 2002-350772 | 12/2002 |
| JP | 2003-015555 | 1/2003 |
| WO | 91/12554 | 8/1991 |
| WO | 91/15930 | 10/1991 |
| WO | 92/09003 | 5/1992 |
| WO | 92/15170 | 9/1992 |
| WO | 9627992 | 9/1996 |
| WO | 97/14987 | 4/1997 |
| WO | 98/04087 | 1/1998 |
| WO | 98/16869 | 4/1998 |
| WO | 98/47106 | 10/1998 |
| WO | 99/42889 | 8/1999 |
| WO | 99/44095 | 9/1999 |
| WO | 00/17708 | 3/2000 |
| WO | 00/36578 | 6/2000 |
| WO | 00/48167 | 8/2000 |
| WO | 00/49453 | 8/2000 |
| WO | 01/15128 | 3/2001 |
| WO | 01/95019 | 12/2001 |
| WO | 02/35277 | 5/2002 |
| WO | 02/091033 | 11/2002 |
| WO | 03/003109 | 1/2003 |
| ZA | 9703025 | 11/1997 |

OTHER PUBLICATIONS

"Teamworkstation 1989-1994," http://web.media.mit.edu/.about.ishii/TSW.html.
"Textarc: An Alternate Way to View a Text," http://textarc.org.
"Textarc: The Print and the Artist," http://textarc.org.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
"Kodak Datashow HR/M Projection Pad", Motion Picture & Audiovisual Products, Eastman Kodak Co., 1988.
Alampiev et al., "Technology of the Three Dimensional Electronic Matrix for Liquid Crystal Display" Jan. 1, 1976.
Blundell et al., "Volumetric Three-Dimensional Display Systems", pp. 1-7.
Buzak, "CRT Displays Full-color 3-D Images".
Cole, et al.; "A Three-Dimensional Display for Radar Returns", pp. 52-53.
General Electric, "3-D Liquid Crystal Display for Mine Detecting Radar" Apr. 1, 1974.
Hattori, T. et al,; "Spatial Modulation Display Using Spatial Light Modulators", Optical Engineering, vol. 31, No. 2, pp. 350-352, (Feb. 1992).
Kozo, T. "Three-Dimentional Display System by Laminated Liquid Crystal Display Device", Patent Abstracts of Japan 02-262119 A, vol. 15, No. 19, pp. 1153, (Jan. 16, 1998).
L.F. Hodges et al., "True Three-Dimensional CRT-Based Displays,"Infor. Display, pp. 18-22 (May 1987).
Minoru, T. "Displaying Method for Stereoscopic Image Using Liquid Crystal Display Element", Patent Abstracts of Japan 62-235929 A, vol. 12, No. 102, pp. 684, (Apr. 5, 1998).
Tamura et al., "Multilayer 3-D Display Adapter", Applied Optics, vol. 17, No. 23, pp. 3695-3696 (Dec. 1, 1978).
Technical Report of the Institute of Television Engineers of Japan, vol. 20, No. 5, Feb. 1996.
Tomohiko Hattori et al: "Spatial Light Modulators" Optical Engineering, vol. 31, No. 2, Feb. 1, 1992, pp. 350-352.

\* cited by examiner

VISUAL DISPLAY UNIT ILLUMINATION

CROSS REFERENCE TO RELATED APPLICATIONS

This application claims priority to and the benefit of the International Application Serial Number PCT/NZ02/0213, having an International Filing Date of 11 Oct. 2002, which claims priority to New Zealand Patent Application No. 514500, filed on 11 Oct. 2001, both of which are herein incorporated by reference in its entirety. Further, this application is a continuation of and claims priority to and the benefit of U.S. application Ser. No. 10/492,624, entitled "VIRTUAL DISPLAY UNIT ILLUMINATION," with filing date 20 Oct. 2004, which is herein incorporated by reference in its entirety, which claims priority to and the benefit of the above referenced International Application Serial Number PCT/NZ2002/00213 and New Zealand Patent Application No. 514500.

TECHNICAL FIELD

The present invention relates to a means for illuminating visual display units, particularly portable computing means including the genre known as Personal Digital Assistants (PDA).

BACKGROUND ART

The relentless tide of technological improvements in computing has inexorably led to ever more powerful computers, of ever-smaller volumes. This has given rise in recent times, to successively smaller incarnations of the Personnel Computer (PC), i.e., the desktop, laptop and notebook computer. Although of reduced physical dimensions in comparison to its predecessor, each has retained a conventional keyboard as its primary means of data input.

However, the advent of yet smaller personnel computing devices, i.e., the palmtop or Personal Digital Assistant (PDA) has precluded the use of a full-size keyboard. Furthermore, the display areas of such devices are equally restricted by their diminutive size. PDAs are typically the size of a user's hand, requiring the user interface to be designed so that input operations are not too intricate and sufficient space is available for data display. These factors are often applicable to a host of other mobile computing means such as mobile telephones, watches, calculators, data loggers, and so forth and as such these devices are included by reference herein.

These space constraints have lead to the incorporation of touchscreens as a means of combining the functions of both data entry and data display. A transfiective liquid crystal display is overlaid with a transparent touch sensitive screen capable of detecting the position of a stylus point impressed upon it. The stylus may be used to select various icons and/or menus in order to issue instructions to the operating system and to input handwritten data. Streamlined versions of popular spreadsheet, word processing and organisational programs are available for PDAs in addition to other specific applications designed for use within the constraints of the PDA hardware.

Most of the systems present in a conventional PC are present in a PDA. These include volatile/dynamic and permanent information storage devices or memory and a logic processor. In contrast to PCs, the operating system of a PDA is usually proprietary and stored on an on-board ROM. Subsequent user-loaded applications are stored in solid state "flash memory" rather than the rotating storage media (magnetic or optical) typically employed in PCs.

Typical PDA transflective displays consist of a birefringent liquid with a chiral additive trapped between conductive layers rubbed with a cloth or similar to align the liquid crystal molecules in a suitable manner. The birefringence of the liquid crystal may be switched to zero by applying an electric field perpendicular to the alignment layers. To achieve this one of the conductive layers is broken up into small, square or rectangular, addressable, electrodes tessellated to form a matrix while the other forms a voltage reference plane. Colour filters can be added over the electrodes to improve the effect.

This arrangement is then placed between sheets of polarising film with either aligned or perpendicular polarisation axes, located in front of a half-silvered mirror and provided with illumination. As the half-silvered mirror transmits 50% and reflects 50% of the incident light, the display can be illuminated from either side, i.e., front or back lit.

Larger, transparent liquid crystal displays (LCD) are fabricated in a similar fashion as the transflective displays with the omission of the half-silvered mirror. Backlighting is provided by cold cathode fluorescent tubes in combination with a light-guide, also known as a light pipe, and diffuser.

Prior art light pipe backlight assemblies are constructed from a light guiding panel with boundaries substantially coterminous with the LCD panel edges (normally rectangular), typically fabricated from an acrylic plastic with similar optical properties to those of borosilicate. A pair of miniature fluorescent light tubes are mounted within suitably designed light reflective mounts (i.e., located at the foci of parabolic reflectors) along the opposite side edges of the acrylic sheet.

The function of the fluorescent light tubes is to produce and direct incoherent light into the interior of the light guiding panel within which the light is typically bounded by the well known principle of "total internal reflection". Under ideal conditions, light will not leak out of the surfaces of the acrylic plastic sheet. However, light can be extracted or caused to 'leak' out from the light guide surface by forming therein scratches, undulations, or any other means of locally altering the critical angle for total internal reflection. The extracted light can be used for illumination purposes such as the above described LCD panel backlighting. A reflector is placed behind the rear surface of the light pipe to reflect rearward emitted light through the LCD, adding to the display illumination.

In order to compensate for the decrease in light guide light intensity as a function of distance from the fluorescent tubes, a light extracting pattern is permanently formed on one or both surfaces of the light guiding panel. Typically, the light extracting pattern is realised as a dot pattern permanently embossed or sandblasted upon the front surface of the acrylic light guiding panel.

In order to achieve light intensity compensation along the light guiding panel, the density of the dot pattern may be configured to increase quadratically with distance from the fluorescent light tubes. This construction provides a constant backlighting luminance across the light guiding panel. Alternative means of maintaining a uniform light emission intensity across the light guide surface is to form the panel with a tapering cross-sectional profile.

In order to integrate (ie diffuse) the spotted distribution of light emanating from the light extracting pattern towards the LCD panel, a light diffusing sheet is placed on top of the light guiding panel. The diffuser is generally a thin sheet of transparent plastic or glass material which has one surface imprinted with small ($=10^{-6}$ m) humps and hollows, is placed over the face of the guide resulting in a thin, bright, uniformly lit lambertian surface. Prismatic films may be also placed between the display and the back-light to increase its efficiency.

A second light diffusing sheet is placed over the rear surface of the light guiding panel in to most commercial "light pipe" backlight designs, to diffuse the spotted distribution of light emanating from the permanently formed diffusion dot pattern on the rearward surface facing towards the reflective surface disposed behind the light guiding panel.

The combination of the light guiding panel, fluorescent light tubes, diffusing sheets and the reflective layer together produce a plane of backlight having a uniform spatial intensity for illumination of the LCD panel affixed to the backlighting panel.

Transflective display constructions are employed in most PDA devices due to their reduced power storage capabilities and their need to function in outdoor and/or bright ambient light conditions.

PDA devices may be generally characterised therefore as having a shortage of display/input interface area and a limited ability to operate power intensive devices such as high luminance emissive displays.

One means of addressing the shortage of display/input interface area is by overlaying a further transparent display pane over the existing PDA display. This type of technology (as described in the applicants co-pending applications PCT/NZ98/00098 and PCT/NZ99/00021, incorporated herein by reference) enables, by various means, the stacking of image planes at set distances. These configurations provide intrinsic motion parallax, where the x and y distance changes between objects displayed on different planes depending on viewing angle, binocular depth cues and separate focal planes that may be brought in and out of focus depending on where the viewer fixes his or her attention.

However, the addition of a further display screen overlaying the existing screen of a PDA type device results in a significantly darkened combined display. This is due in part to the intrinsic attenuation of light passing through the additional layers of the additional to display and to the unpracticality of increasing the backlighting luminance due to the power constraints discussed above.

There is therefore a need to provide an enlarged display area of PDA type devices (as hereinbefore defined) without incurring a detrimental loss in display brightness.

All references, including any patents or patent applications, cited in this specification are hereby incorporated by reference. No admission is made that any reference constitutes prior art. The discussion of the reference states what their authors assert, and the applicants reserve the right to challenge the accuracy and pertinency of the cited documents. It will be clearly understood that, although a number of prior art publications may be referred to herein, this reference does not constitute an admission that any of these documents forms parts of the common general knowledge in the art in any country.

It is an object of the present invention to address the foregoing problems or at least to provide the public with a useful choice.

DISCLOSURE OF INVENTION

According to one aspect of the present invention there is provided a method of adapting a visual display unit having a first screen in a first focal plane by the addition of one or more at least partially transparent display screens at least partially overlapping said first screen and located in focal planes distinct from said first focal plane, characterised in that an at least partially transparent emissive layer is provided between said first screen and at least one said additional display screen.

As used herein, the term 'emissive layer' includes any optical component capable of emitting light when stimulated by an external input, whether electrical, optical, mechanical, magnetic or other.

As used herein, the term 'visual display unit' includes, but is not limited to personnel digital assistants (PDA), computing means—including portable and/or hand held, devices, mobile phones, watches, calculators, data loggers, cameras, instrument displays, televisions, and any other electronic display means.

According to a further embodiment, there is provided visual display unit produced by the above-described method.

According to a still further aspect of the present invention there is visual display unit having two or more at least partially overlapping display screen located in distinct focal planes, at least one said screen being at least partially transparent; characterised in that an at least partially transparent emissive layer is provided between said screens.

It may be seen therefore, that a visual display unit such as a PDA may be adapted to incorporate multi focal plane displays and an emissive layer either at the initial manufacturing stage, or retro-fitted as a separate accessory.

According to one aspect of the present invention, said emissive layer is a sheet with substantially planar opposed upper and a lower surfaces and a peripheral boundary of a prescribed thickness, said sheet formed from a material such that light rays incident from said peripheral boundary are retained between the said planar surface through total internal refraction at angles less than a critical angle.

Preferably, at least one said sheet planar surface has a plurality of defined features located thereupon capable of refracting a said retained light ray incident on a said feature through an angle greater than the said critical angle of total internal reflection sufficient to exit said sheet via one of said planar surfaces.

Preferably, said features include diffusion dots, predetermined scratches, indentations grooves, protrusions, regular or irregular undulations and the like.

Preferably, at least one light source such as cold cathode fluorescent tube is located along said peripheral edge.

In an alternative embodiment, said light source is an array of light emitting diodes.

Preferably, said emissive layer is configured to refract the ray axis of light at the said peripheral border such that the peripheral border between adjacent screens is not visible along said viewer's sightline.

According to one aspect of the present invention, the said features are distributed with an increasing density as a function of distance (e.g. a quadratic function) from said light source.

According to an alternative embodiment of the present invention, the said prescribed thickness of the emissive sheet is reduced as a function of distance from a said light source.

The above configurations of the said feature distribution and emissive sheet thickness both provide a means of outputting a uniform light intensity, avoiding decreasing intensity with distance from the light source.

According to one embodiment of the present invention, said emissive layer is formed from a light guide.

According to an alternative embodiment of the present invention, said emissive layer is formed from a transparent organic light emitting diode (TOLED) assembly.

A TOLED emits light uniformly from both sides and does not necessarily require the above-described means of controlling the light intensity distribution via said defined features and the like.

However, the fact that light emits from both sides of a TOLED can in-itself cause degradation of the image seen by the viewer. This is due to the fact that light emitted upwards through transparent portions of the front LCD panel towards the viewer will be transmitted with equal intensity, irrespective of whether the rear LCD panel is displaying a clear or black region at any given point on the rear screen.

Whilst this causes no drawback for the transparent portions of the rear screen, black regions (e.g. text) appear grey, with reduced contrast to an adjacent transparent region. The light emitted from the TOLED has no means of being directly varied according to whether it is aligned or overlays a portion of black text on the rear screen.

This drawback is addressed by the use of a wire grid polariser and a polarised TOLED, i.e. a TOLED emitting polarised light. Optionally, an optical retarder may also be incorporated. This combination (described below) effectively re-cycles the light radiating directly upwards from the TOLED and re-orientates the polarisation of the light to maximise the illumination of the displays without degrading the display contrast Thus in a preferred embodiment of the present invention, said emissive layer is a polarised TOLED emissive layer located between a front screen and a rear screen, wherein a wire grid polariser and is interposed between the TOLED and the front screen.

As used herein, the front and rear screens are defined with respect to the physical proximity of a user viewing the displays in a conventional manner, i.e the front screen is nearer to the user than the rear screen. One or more additional screens may be located between the said front and rear screens.

Polarised light is emitted from both surfaces of the TOLED, with the upward/outward emissions potentially degrading the clarity, contrast and/or effectiveness or the composite image formed by all the overlapping display screens.

Wire grid polarisers are defined herein to include any polariser capable of transmitting P polarised light whilst reflecting S polarised light or vice versa.

Polarization is defined relative to the plane of incidence, i.e. the plane that contains the incoming and reflected rays as well as the normal to the sample surface.

S polarization is where the electric field is perpendicular to the plane of incidence, while for P polarization, the electric field is parallel to the plane of incidence.

Wire grid polarisers may be formed from a variety of materials and manufacturing techniques, though they generally include a regular formation of spaced lines formed on a transparent substrate or film.

The strips may be an array of extremely fine metal wires deposited on a face of an optically transparent window such as KRS-5 or ZnSe Since the electric field of the light oriented along the direction of wires can induce electrical currents along the wires, the wire grid acts as a metal surface reflecting virtually all the radiation polarized along the direction of the wires. The electric field perpendicular to the direction of wires is unable to induce electrical current in the wire grid. Thus, the light transmits through the polariser with only the reflectance losses from the substrate window.

In alternative constructions, precisely spaced groves are ruled directly into a highly polished $CaB_2$ or ZnSe substrate which is then aluminised. Holographic methods may also be employed to produce grooves for holographic wire grids.

Thus, wire grids have the property that incident light of a given polarisation may pass through the polariser, whilst light of orthogonal polarisation to said given polarisation is reflected reciprocally. It follows therefore, that if a wire grid polariser is illuminated by light polarised in the same direction as the polarisation axis of the grid, all the light will be reflected. Conversely, polarised light orientated orthogonally to the polarisation axis of the wire grid will be transmitted through the grid. However, polarised light incident on the wire grid polariser.

In one embodiment therefore, the polarisation axis of the wire grid is arranged to reflect polarised light emitted from the TOLED back through the TOLED towards the rear screen.

Preferably, said rear screen is a cholesteric LCD display.

In one embodiment, the reflected light passes through a quarter wave retarder before being reflected by said rear screen. This produces a quarter wavelength shift in the light, which is then reflected and circularly polarised by the rear display. However, it will be appreciated that retarders producing other degrees of retardation may be utilised, depending on the characteristics of the incident light and the display screens.

The light reflected by the rear display passes through the quarter wave retarder a second time before passing through the TOLED a second time to the wire grid polariser. The retarder applies a further quarter wave shift resulting in linearly polarise light. Regions denoting text or graphics on the rear display, i.e. those regions preventing the transmission of light, remain un-illuminated regions in the light reflected from the rear screen to the viewer.

The linearly polarised light then passes through the wire grid polariser and front screen polariser.

The above configuration thus effectively re-cycles the light emitted from the upper surface of the TOLED which would otherwise degrade the contrast and luminance of the image seen by viewer.

In an alternative embodiment, the retarder may be omitted altogether. In such embodiments, the light emitted from TOLED directly towards the rear screen (10) plus the light reflected from the wire grid polariser is directly reflected by the rear screen (10) before being transmitted trough the wire grid polariser and front screen.

The degree to which the reflected light from the rear display is transmitted through the wire grid polariser depends on its polarisation, which in turn depends on the polarisation of the light incident on the rear screen. A cholesteric rear LCD rear screen behaves essentially as a circular polariser. Consequently, for the three possible polarizations of light incident on the rear screen, the reflected light polarisation is as follows:

i. the incident light is randomly polarized in which case that which is reflected will be circularly polarized;
ii. the incident light is linearly polarized in which case it will emerge circularly polarized;
iii. the incident light is elliptically polarized in which case it will emerge as elliptically polarized.

The reflected light is able to pass through the wire grid unaffected if its polarisation orientation corresponds with the transmission axis of the wire grid, i.e. linearly polarised.

If the reflected light is circularly polarised, it is advantageous to use an appropriate retarder to correct the polarisation alignment to match that of the wire grid polariser.

Preferably, said screens are liquid crystal displays. However, it will be understood alternative constructions are possible and the invention is not necessarily limited to the use of LCDs.

The main criteria for the rear display is that it reflect the incident light to at least some degree. Alternatives to LCD displays suitable for this purpose include the recently developed 'electronic paper'. This is an area of considerable interest in display research circles, with the aim of producing a product forming an electronic alternative to conventional paper with a very thin, inexpensive, low power consumption display for text and static images. This electronic paper is intended to provide a product that is addressable in the manner of a desktop display but without the same bulk.

Technologies involved include interferometric modulators which are formed by a switchable array of optically resonant cavities, micro-encapsulated electrophoretic displays which use electrically controllable pigments as well as well established reflective and transflective liquid crystal technologies.

These and any other type of display that reflects between 10% and 1.00% of the incident light would be suitable for use as the rear display in the present invention.

Consequently, by virtue of incorporating an at least partially transparent emissive layer, a practical multi-focal plane visual display unit such as a PDA may be realised. The transparent properties of the emissive layer permit transflective display constructions to be retained and thus dispensing with the need for additional powered display illumination in conditions of high ambient light. When additional illumination is required indoors, or in low-light environments, the emissive layer provides a low-power means of providing the necessary illumination.

It will furthermore be appreciated that the above-described configuration using a TOLED as the emissive layer need not necessarily be applied between two display screens.

Instead, the configuration may be used as a front illumination means in other single or multi layer displays, either individually, or in combination with other backlight and/or emissive layers located between the displays.

Thus, according to a further aspect of the present invention there is provided a visual display unit illumination assembly including;
 a polarised transparent organic light emitting diode (TOLED) and a wire grid polariser located between the TOLED and an observer viewing the visual display unit.

Optionally, said illumination assembly incorporates an optical retarder located between the TOLED and a rear of the display. The degree of retardation (e.g. a quarter wave retarder) may be defined according to variation between the polarisation of the light emitted from the TOLED and reflected from the rear display screen(s) and polarisation transmission axis of the wire grid polariser. It will be appreciated that the degree of retardation provided by optical retarder need be half the total phase shift required, as the light passes through the retarder twice.

Said illumination assembly may be used in front of a visual display unit comprised of one or more screens, though attenuation of light by successive screens places a limit on the number of screen layers. The illumination assembly may also be located between two screens in a multi-layered display, as described in the above embodiments.

The visual display unit illumination assembly may thus be fitted to the front of a multi-layered display, such as a two screen LCD display unit as a replacement for a conventional backlight. The illumination assembly may also be used in applications where a user needs to view an object/scene from substantially the same direction as an illumination source directed at the scene/object, e.g. a dentists or jewellers light with a central transparent magnifying section.

Further aspects and advantages of the present invention will become apparent from the ensuing description which is given by way of example only.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

FIGS. 1-7 illustrate preferred embodiments of the present invention in the form of a personal digital assistant (PDA), or parts thereof. However, it should be appreciated that the present invention is equally applicable to a variety of visual display units including portable and/or hand held computing means such as mobile phones, watches, calculators, data loggers, and such like and these are defined for the purposes of the specification as being encompassed by the invention.

Figure 1:
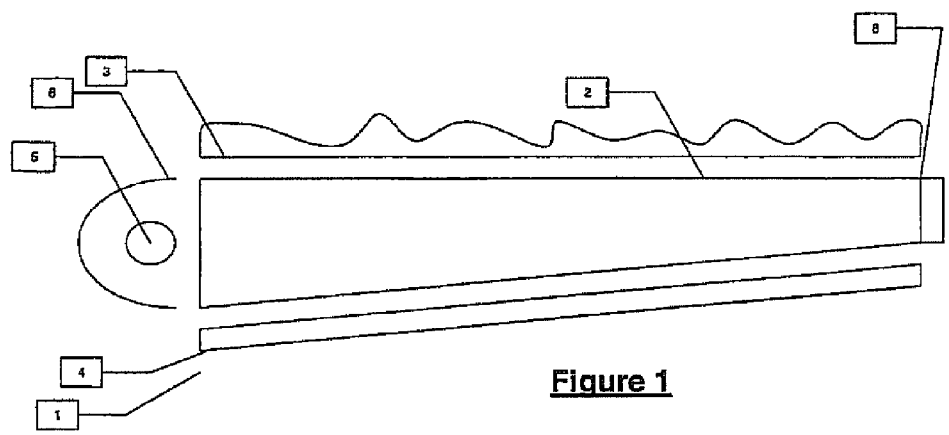
FIG. 1 shows a schematic cross sectional side elevation through a light pipe backlighting assembly of prior art displays.

Existing devices incorporating portable visual display units such as PDAs are severely to restricted in their power consumption requirements of their components due to the limited battery storage capacities. Consequently, there is widespread adoption of transflective displays and the use of light pipes or light guides as part of the backlighting assembly. FIG. 1 shows a typical back light assembly (1) used in notebook type computers incorporating a light guide (2) in the form of a rectangular clear acrylic sheet with a substantially planar upper and lower surface with a diffuser (3) and a reflector (4) affixed thereto or located adjacent to respectively.

The light guide has along one peripheral edge, a cold cathode florescent tube (5) housed within a parabolic reflector (6) which reflects the illumination through the peripheral boundary wall of the light pipe (2), it there being retained by virtue of total internal reflection. Either or both of the planar surfaces of the light guide (2) may be provided with a plurality of diffusion dots (7). Essentially, the light guide (2) provides an illumination source and is not part of the optical portion of the display.

Figure 2:
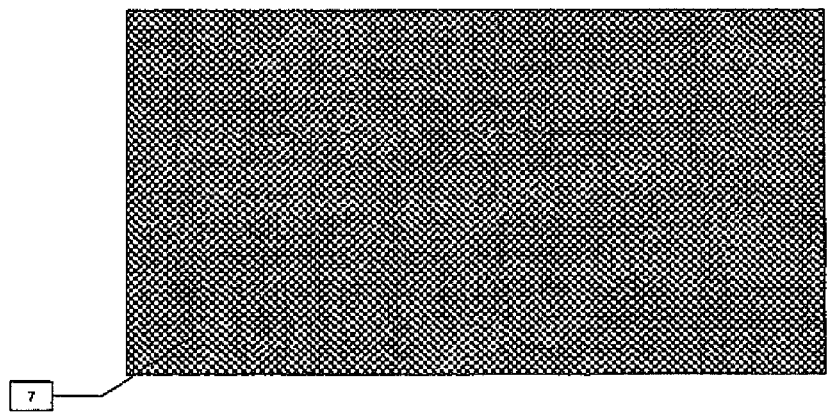
FIG. 2 shows a plan view of the diffusion dot dispersion pattern distributed on the surface of a light pipe.

As shown in plan view in FIG. 2 the diffusion dots (7) are localised regions whereby the light constrained within the light guide striking the diffusion dots (7) exceed the critical angle for total internal refraction and are emitted from the planar surface. To maintain an even distribution of luminosity, the cross sectional profile of the light guide (2) tapers with respect to distance from the florescent tube (5). The opposing peripheral edge to the florescent tube (5) is provided with an end reflector (8).

The back lighting assembly shown in FIG. 1 is located at the rear most portion of typical notebook-type computer display screens.

Figure 3:
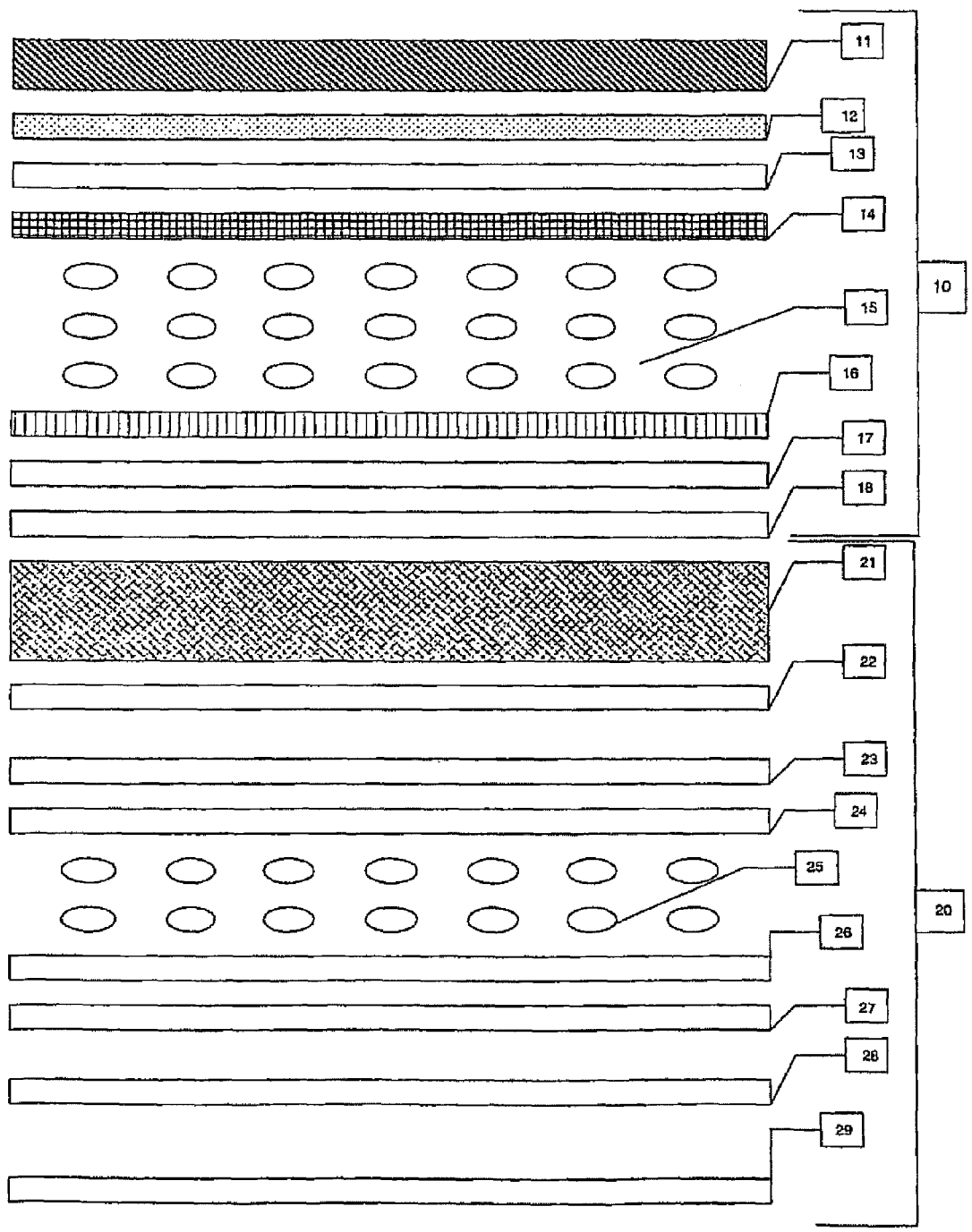
FIG. 3 shows a schematic composite view of a first preferred embodiment of the present invention.

Display area and/or user input interface area is at a premium in PDAs due to their size. FIG. 3 shows a cross sectional diagram through an existing PDA (1) configuration fitted with a supplementary display (20), which is parallel to and spaced apart from the original display (10).

Referring specifically to FIG. 3, a polarised back light source (11) (of known type) located at the rear of the display (10) is placed behind a composite series of layers comprised, in sequence, of a half silvered mirror (12), a glass substrate (13), a rubbed conductive ITO ground layer (14), a liquid crystal (15), an ITO layer with an electrode pattern and subsequent rubbed polyimide layer (16), glass substrate (17) and an analyser (18). This construction is typical of transflective LCDs as is well known to those in the art and is not discussed in further detail.

The original display (10) may be augmented by attaching a second display (20) which is attached over the planar face of the original display (10) and is substantially co-terminus with same.

The second display (20) is also comprised of a plurality of layers which in sequence from the front of the original display (10) consists of, an emissive transparent refractor (21), a rear analyser/polariser (22), a glass substrate (23), a rubbedITO conductive ground layer and subsequent polyimide alignment layer (24), a second liquid crystal (25), a rubbed polyimide alignment layer and subsequent ITO electrode pattern (26), a front glass substrate (27), front analyser (28), and a diffuser (29). The diffuser (17) may be applied to the surface of a touch screen layer (30). FIG. 3 shows an embodiment whereby the two display assemblies (10, 20) are combined at the manufacturing stage as a homogenous unit.

Figure 4:
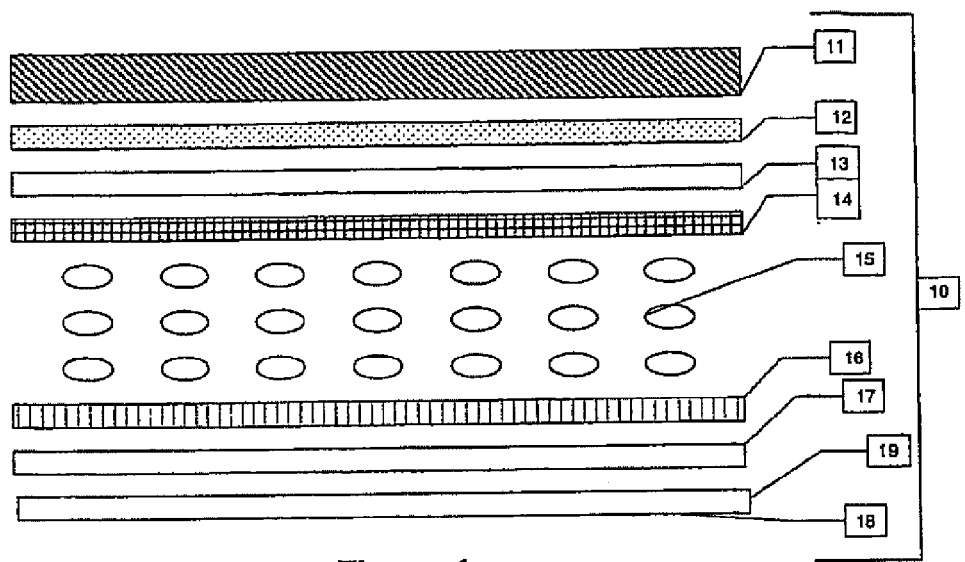
FIG. 4 shows a schematic cross section through a known PDA display.
Figure 5:
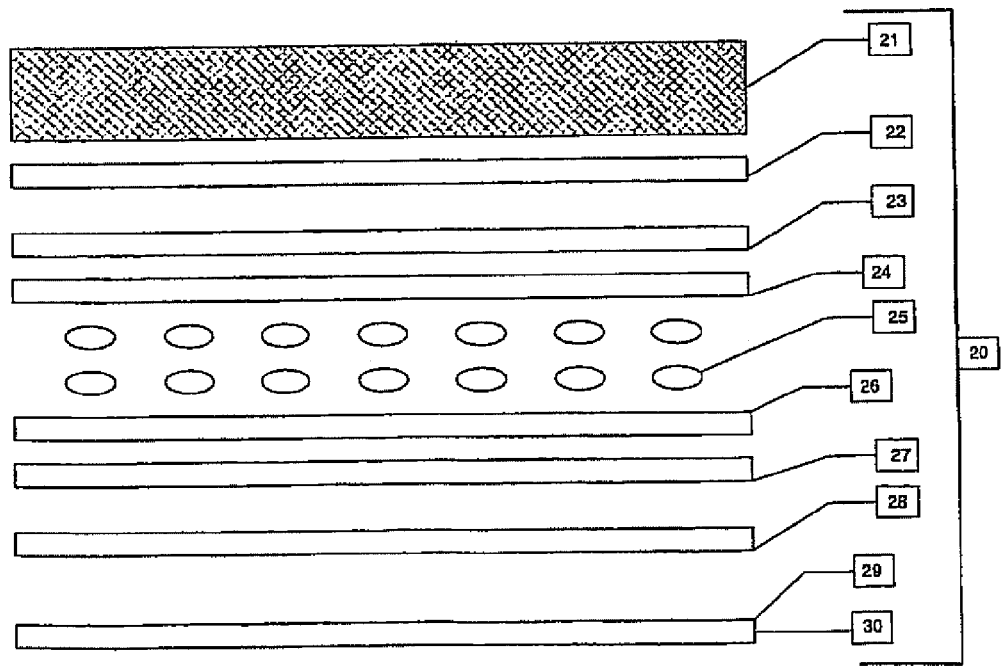
FIG. 5 shows a schematic cross sectional view through a further preferred embodiment of the present invention.

Alternatively, the second display (20) may be retro-fitted as a distinct unit to the front of a PDA display (10) as illustrated in FIGS. 4 and 5 where identical elements to that shown in FIG. 3 are like numbered.

FIG. 4 shows an existing PDA display (10) with the additional layer (to that illustrated in FIG. 3) of a touch screen layer (19) to which the diffuser (18) layer may be affixed.

FIG. 5 shows the secondary display screen (20) which is connected to the original screen (10) via appropriate mounting clips (not shown) and coupled to the PDA processor via appropriate drive electronics and power supply interfaced via an expansion slot as commonly found in known PDAs. Such interconnections are well known to those in the art and are consequently not discussed further herein.

The emissive layer, or emissive transparent refractor (21) is formed in one embodiment from a sheet of acrylic plastic known as a light guide (2) or light pipe as described with reference to FIG. 1. A light guide generally consists of a sheet with two substantially planar opposing surfaces on which a number of defined features such as diffusion dots (7) are located. The light guide is illuminated by one or more light sources, eg cold cathode florescent tubes (5) located about the peripheral edge of the light guide (21) in a corresponding manner to that shown in FIG. 1.

The configuration of the emissive layer (21) corresponds almost directly to the light guide (2) shown in FIG. 1 with exception that a lower reflector (4) is omitted. Light may be emitted from both planar surfaces from the emissive transparent light guide (21) to directly illuminate both LCD displays, (10, 20). However, preferably, only the lower planar surface of the light guide (2) is provided with a plurality of diffusion dots (7) to restrict the emitted illumination to the rearward display (10) only. The light is then reflected from the cholesteric liquid crystal in the rearward display (10) and is transmitted through the emissive layer (21) and front display screen (20).

Restricting the light emission in this manner ensures regions of text or graphics on the rearward screen (10) do not align directly with light emitted directly from the emissive display (21) through the front display (20) to a viewer with a corresponding reduction in contrast and greying/fading of tones.

Figure 6:
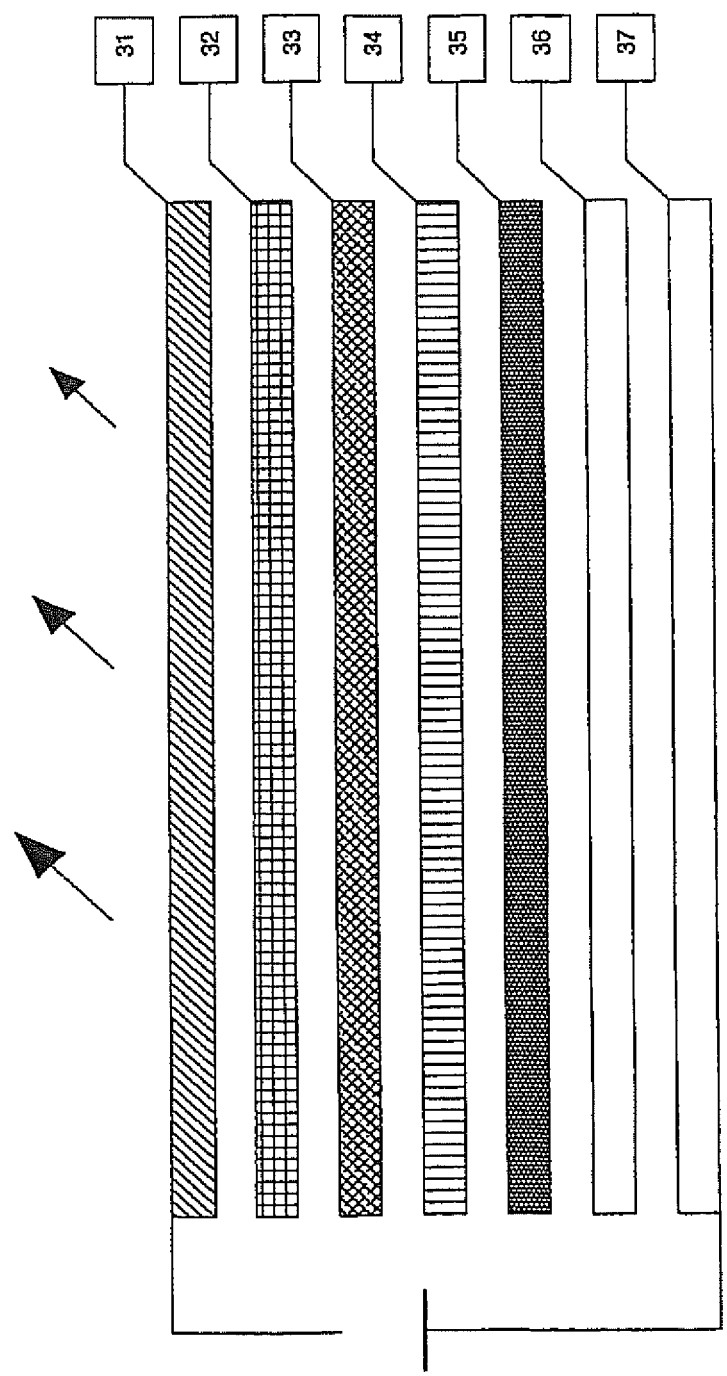
FIG. 6 shows a schematic cross sectional view through an TOLED in accordance with a further preferred embodiment of the present invention.
Figure 7:
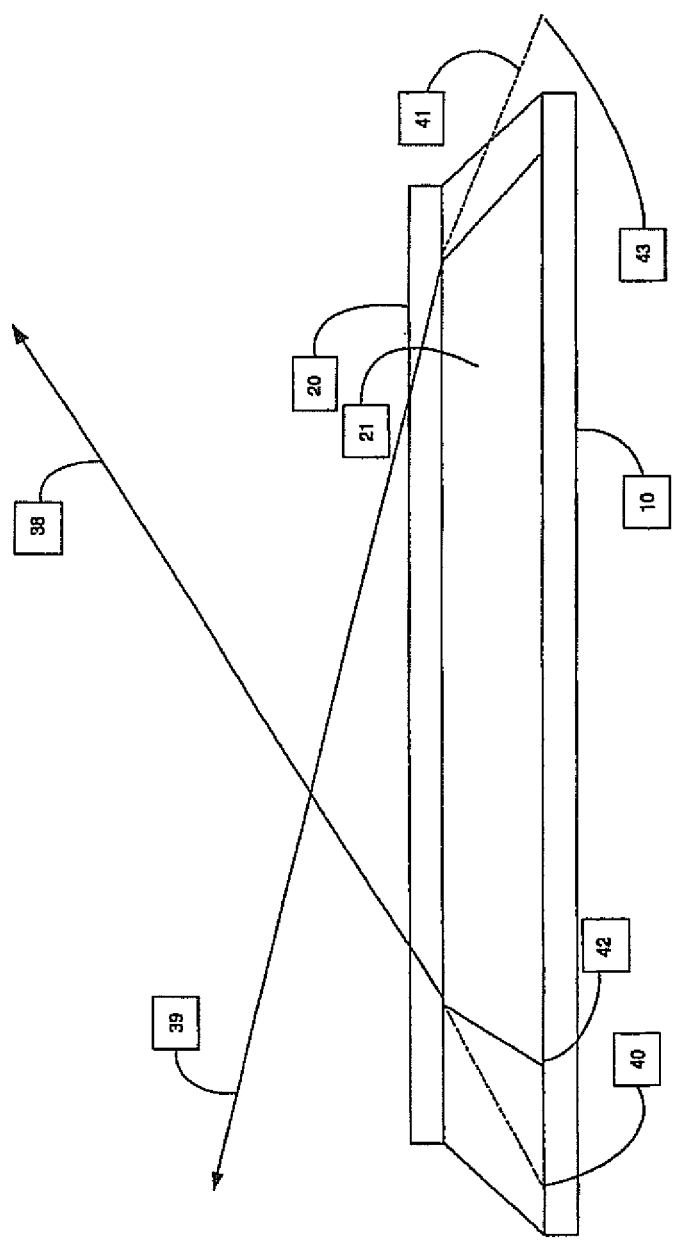
FIG. 7 shows a schematic cross sectional view through the embodiment of the present invention shown in FIGS. 3, 5 and 6.

In an alternative embodiment, the light guide (21) may be replaced by a transparent organic light emitting diode (TOLED) light source (30). FIG. 6 shows an existing TOLED backlight (30) composed of a further plurality of layers in the form of a transparent anode (31), a glass plate (32), a hole injection layer (33), a hole transport layer (34), an electron transport layer (35), a light generating layer (36) and a cathode (37).

Organic light omitting diodes are a recent entry in the field of display technology and provide numerous beneficial characteristics for use in lighting applications. However, large area TOLEDs are not currently available, thus lending TOLEDs backlights to small area LCD displays and the like. The operating principle of a TOLED (30), as illustrated in FIG. 6 is based on electron-whole recombination. A glass plate (32) containing transparent anode (31) (usually an ITO) is employed as a substrate for depositing small molecules in a series of organic layers (33-36). Electrons are injected in the organic layers (33-36) by the cathode upon application of a DC voltage beyond a critical threshold voltage. Holes are correspondingly injected into the organic layers (33-36) by the anode (31). Electrons travelling through the electron transport layer (35) meet the holes from the anode (31) through the hole injection layer (33) and hole transport layer (34). The recombination of the electrons with the holes at the light-generating layer (36) creates "excitons" (excited neutral molecule) which subsequently fall back to ground state thereby releasing the recombination energy in the form of visible radiation.

The light-generating layer (36) may be doped with traces of specific organic molecules (dopants) in order to improve the efficiency of the generated light. The light generating layer (36) utilising dopants is generally called the "host" layer. Appropriate choice of dopants and hosts can lead to the generation of different colour light; white light may be created by two layers of hosts and dopants.

In order to utilise the TOLED (30) illustrated in FIG. 6 as an emissive transparent refractor (21), (as opposed to its role as a back light), it is necessary to specify that the cathode (37) is transparent in order that the emitted light may illuminate both the LCD screens (10, 20). Possible configurations of embodiments using TOLED (30) in place of a light guide (2) as the emissive layer (21) correspond to that shown in FIGS. 3-5, with the substitution of the TOLED (30) for the emissive transparent refractor (21).

By forming the rearward screen (10) to be enlarged with respect to the front screen (20), the refractive properties of the emissive transparent reflector (21) prevent the sightline access of the viewer from detecting the actual edge boundaries of the rearward display (10) at shallow angles of incidence. This may be seen in FIG. 7 whereby emitted light rays (38 and 39) originating from object points (42, 43) respectively appear to originate from image points (40, 41) respectively. This prevents the peripheral edge of the portion of the combined display located between the separate LCD units (10, 20) being visible to the viewer. This also enhances the three-dimensional quality of the whole display (10, 20).

It will be appreciated that various alterations and permutations may be made to the display assemblies shown without departing from the scope of the invention. For example, two or more further displays (20) may be added to an existing display (10) to provide yet further available display area, each display with or without an associated emissive transparent refractor (21).

Although the above embodiments refer to the use of a liquid crystal displays, it will be understood that these are not essential and that any alternative displays technologies may be employed, whether non-emissive or self-emissive, provided the or each front display is at least partially transparent.

Figure 8:
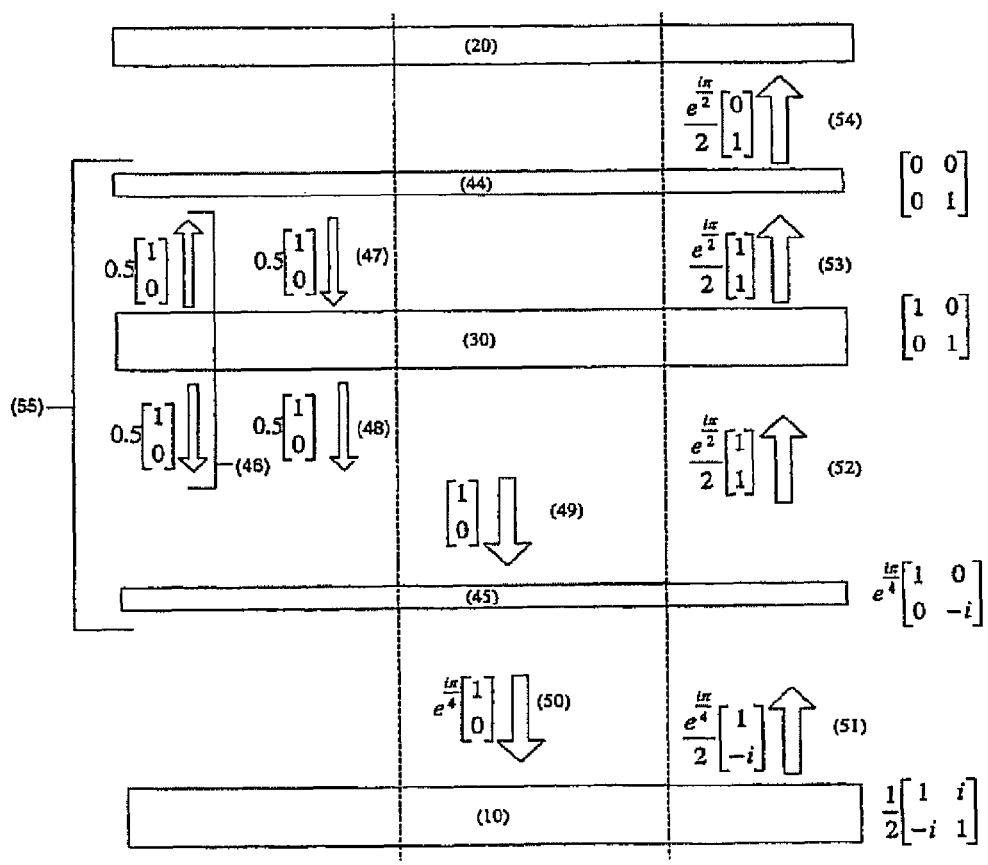
FIG. 8 shows a schematic cross sectional view through a TOLED in accordance with a further preferred embodiment of the present invention.

FIG. 8 shows a yet further embodiment of the present invention, addressing a shortcoming of the above-described TOLED—based embodiment. As light is emitted equally from both surfaces of the TOLED, areas of the TOLED overlapping regions of text or graphics on the rearward screen (10) will appear grey (in the case of a display using monochrome LCD screens) instead of black, due to the extra luminance emitted towards the viewer by TOLED. As the light transmitted from the TOLED through front screen (20) has no interaction with the rearward display (20), it is impossible to overcome this drawback without intervening in the optical path of the light. Unlike a light guide (2), it is difficult to restrict the emission of light to only one surface without affecting the transparency of the TOLED (30).

This difficulty is overcome in the embodiment shown in FIG. 8 by incorporation of a wire grid polariser (44) between the TOLED (30) and the front (20) screen and an optical retarder (45) located between the TOT PT) (30) and rearward screen (10).

The passage of light emitted from the TOLED (30) layer is described with reference to stages 46-53 with reference to the associated Tones vectors and matrices.

In this embodiment, the TOLED (30) is configured to emit polarised light. Initially, light is emitted (stage 46) from both sides of the TOLED (30) towards the front (20) and rearward (10) displays, each represented by the Jones Vector (46) of $$0.5 \begin{bmatrix} 1 \\ 0 \end{bmatrix}.$$

The light (47) emitted towards the front display (20) is reflected from the wire grid polariser (44) and passes back through the TOLED (30), summing with the light (48) originally emitted towards the rear screen (10) (of the same polarisation) with the resultant light (49) having a Jones Vector of $$\begin{bmatrix} 1 \\ 0 \end{bmatrix}.$$

The resultant linearly polarised illumination (49) passes through the optical retarder (45) which applies a corresponding phase shift. In the embodiment shown the retarder (45) produces a quarter wavelength phase shift, as denoted by its corresponding Jones matrix $$e^{\frac{i\pi}{4}} \begin{bmatrix} 1 & 0 \\ 0 & -i \end{bmatrix}.$$

The resultant transmission is given by the equation;

$$e^{\frac{i\pi}{4}} \begin{bmatrix} 1 & 0 \\ 0 & -i \end{bmatrix} \begin{bmatrix} 1 \\ 0 \end{bmatrix} = e^{\frac{i\pi}{4}} \begin{bmatrix} 1 \\ 0 \end{bmatrix}. \quad \text{i)}$$

The resultant retarded light (50) is reflected by the liquid crystal of the rear cholesteric display (10), which behaves essentially as a circular polariser. Given that the Jones matrix of the rear display is $$\frac{e^{\frac{i\pi}{4}}}{2} \begin{bmatrix} 1 \\ -i \end{bmatrix},$$

the resultant reflected light (51) is described by the equation;

$$\frac{1}{2} \begin{bmatrix} 1 & i \\ -i & 1 \end{bmatrix} e^{\frac{i\pi}{4}} \begin{bmatrix} 1 \\ 0 \end{bmatrix} = \frac{e^{\frac{i\pi}{4}}}{2} \begin{bmatrix} 1 \\ -i \end{bmatrix}. \quad \text{ii)}$$

The reflected light (51) is then re-transmitted through the retarder (45) with a further quarter wave retardation with a resultant linearly polarised output given by the equation;

$$e^{\frac{i\pi}{4}} \begin{bmatrix} 1 & 0 \\ 0 & -i \end{bmatrix} \frac{e^{\frac{i\pi}{4}}}{2} \begin{bmatrix} 1 \\ -i \end{bmatrix} = \frac{e^{\frac{i\pi}{2}}}{2} \begin{bmatrix} 1 \\ 1 \end{bmatrix}. \quad \text{iii)}$$

The light (51) transmitted through the retarder (45) passes again through the TOLED layer (30). As the Jones matrix of the TOLED (30) is the identity matrix $$\begin{bmatrix} 1 & 0 \\ 0 & 1 \end{bmatrix},$$

the resultant effect of the transmission, as given by the equation;

$$\begin{bmatrix} 1 & 0 \\ 0 & 1 \end{bmatrix} \frac{e^{\frac{i\pi}{2}}}{2} \begin{bmatrix} 1 \\ 1 \end{bmatrix} = \frac{e^{\frac{i\pi}{2}}}{2} \begin{bmatrix} 1 \\ 1 \end{bmatrix}, \quad \text{iv)}$$

leaves the resultant light (53) unchanged.

The light (53) re-transmitted through the TOLED (30) then passes through the wire grid polariser (44) described by a Jones matrix of $$\begin{bmatrix} 0 & 0 \\ 0 & 1 \end{bmatrix}$$

with the resultant transmitted light (54) given by the equation;

$$\begin{bmatrix} 0 & 0 \\ 0 & 1 \end{bmatrix} \frac{e^{\frac{i\pi}{2}}}{2} \begin{bmatrix} 1 \\ 1 \end{bmatrix} = \frac{e^{\frac{i\pi}{2}}}{2} \begin{bmatrix} 0 \\ 1 \end{bmatrix}. \qquad \text{v)}$$

The resultant light (54) transmitted through the wire grid polariser (44) preserves all the polarising attributes of each portion of the any image generated on the rear screen (10), maintaining the relative luminosity between the darkened and light areas. In the embodiment shown in FIG. 8, this light (54) then passes through the front screen (20).

However, in alternative embodiments, the combination of the TOLED (30), wire grid polariser (44) and (optionally) the optical retarder (45), collectively forming an illumination assembly (55) may be located in front of a multi-screen display or even used as a transparent illumination means enabling a user to illuminate a scene whilst viewing the scene from the same axis as the illumination source.

The inclusion of the retarder (45) is optional depending on the reflective properties of the rear display (10). The retarder (45) is thus used to correct the oscillation plane of the electric field (i.e. the polarisation) to ensure the eventual transmission through the wire grid polariser (44) is achieved with the minimum of absorption losses.

In the above example, the rear display (10) is a cholesteric transflective liquid crystal, which acts as a circular polariser. Dependent on the polarisation of the incident light (49), the light reflected from the rear screen (10) may be one of the following:

i. the incident light is randomly polarized in which case that which is reflected will be circularly polarized;
ii. the incident light is linearly polarized in which case it will emerge circularly polarized;
the incident light is elliptically polarized in which case it will emerge as elliptically polarized.

The retarder (45) is thus incorporated only if required to alter the polarization orientation of the light reflected from the rear screen (10) before it being transmitted or reflected by the wire grid polariser (44).

Figure 9:
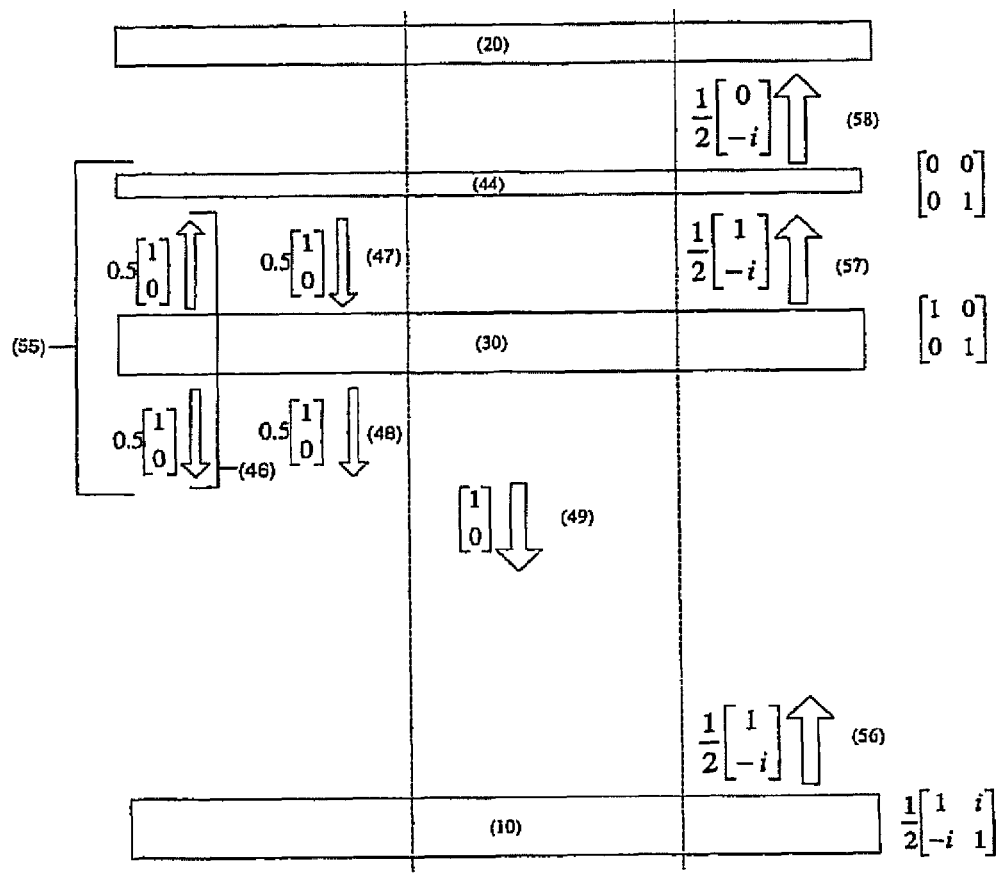
FIG. 9 shows a schematic cross sectional view through a TOLED in accordance with a further preferred embodiment of the present invention.

FIG. 9 shows an embodiment of the present invention identical to that shown in FIG. 8, with the exception that the optical retarder (45) is omitted. Like components (10, 20, 44, 47) are like numbered. Similarly, the transformation of the light (46, 47, 48, 49) emitted from the TOLED (30), reflected from the wire grid (44), transmitted through the TOLED (30), and that incident on the rear screen (10) is identical to that shown in FIG. 8 with like reference numbering. The Jones vectors associated with the light (46, 47, 48, 49) and the Jones matrices characterizing the front screen (20), rear screen (10), TOLED (30) and wire grid polariser (44) are also identical to the previous embodiment.

Thus, considering the situation following the incidence of light (49) on to the rear screen (10) that has not passed through a retarder (45), the subsequent transitions are as follows;

The incident light (49) characterized by the Jones vector $$\begin{bmatrix} 1 \\ 0 \end{bmatrix}$$

is reflected by rear screen (10) with a resultant transformation given by the equation;

$$\frac{1}{2}\begin{bmatrix} 1 & i \\ -i & 1 \end{bmatrix}\begin{bmatrix} 1 \\ 0 \end{bmatrix} = \frac{1}{2}\begin{bmatrix} 1 \\ -i \end{bmatrix}. \qquad \text{vi)}$$

The reflected light (56) then passes through the TOLED (30) again. As the Jones matrix of the TOLED (30) is the identity matrix $$\begin{bmatrix} 1 & 0 \\ 0 & 1 \end{bmatrix},$$

the resultant effect of the transmission as given by the equation;

$$\begin{bmatrix} 1 & 0 \\ 0 & 1 \end{bmatrix}\frac{1}{2}\begin{bmatrix} 1 \\ -i \end{bmatrix} = \frac{1}{2}\begin{bmatrix} 1 \\ -i \end{bmatrix}, \qquad \text{vii)}$$

leaves the resultant light (57) unchanged.

The light (57) transmitted through the TOLED (30) is then transmitted through the wire grid (44) characterized by the Jones matrix $$\begin{bmatrix} 0 & 0 \\ 0 & 1 \end{bmatrix}$$

to the extent given by the equation;

$$\begin{bmatrix} 0 & 0 \\ 0 & 1 \end{bmatrix}\frac{1}{2}\begin{bmatrix} 1 \\ -i \end{bmatrix} = \frac{1}{2}\begin{bmatrix} 0 \\ -i \end{bmatrix}. \qquad \text{viii)}$$

In accordance with recognised convention, the imaginary component is only considered to as a mathematical aid in expressing the polarisation orientation. The resultant output (58) gives a Jones vector of $$\frac{1}{2}\begin{bmatrix} 0 \\ -i \end{bmatrix}$$

in comparison with a Jones vector of $$\frac{e^{\frac{i\pi}{2}}}{2}\begin{bmatrix} 0 \\ 1 \end{bmatrix}$$

for the corresponding light output (54) produced in the embodiment incorporating a retarder (45). This difference is just a phase shift of 180 degrees with respect to the other.

Since the eye integrates over time it cannot distinguish this difference, and the resultant luminance of the both embodiments appears the same.

Thus, when using a cholesteric liquid crystal rear display (10), or other display with the same reflective properties, the retarder (45) may be omitted without detriment. If, however, the rear display (10) and/or any additional optical components that may be placed in the light path from the TOLED (30) to the front screen (20) results in a misalignment between the polarisation axis of the wire grid (44) and the light incident on it, the retarder (45) may be used to correct for misalignment.

As visual display unit back lights and other such illumination sources generate heat which may can be difficult to dissipate without constraints on casing design and/or the need for active cooling such as fans. Placing the illumination source forward of the front screen may alleviate such heating issues. Thus, an illumination assembly may, for example, be used with single screen displays to replace backlights in applications such as notebook computers and the like.

In such instances, the wire grid polariser (44) is formed on the inner surface of a substrate, or between substrate layers in a sandwich construction, to protect the delicate wire grid.

Aspects of the present invention have been described by way of example only and it should be appreciated that modifications and additions may be made thereto without departing from the scope thereof.

The invention claimed is:

1. A method of adapting a visual display unit, comprising:
   providing a first screen in a first focal plane; and
   adding one or more at least partially transparent display screens at least partially overlapping said first screen and located in focal planes distinct from said first focal plane, wherein an at least partially transparent emissive layer is provided between said first screen and at least one said additional display screen, wherein said emissive layer is configured for providing light to said first screen and said one or more at least partially transparent display screens, and wherein said emissive layer is a sheet with substantially planar opposed upper and lower surfaces and a peripheral boundary of a prescribed thickness, said sheet formed from a material such that light rays incident from said peripheral boundary are retained between the said planar surface through total internal refraction at angles less than a critical angle.

2. The method of claim 1, wherein at least one said sheet planar surface has a plurality of defined features located thereupon capable of refracting a said retained light ray incident on a said feature through an angle greater than the said critical angle of total internal reflection sufficient to exit said sheet via one of said planar surfaces.

3. The method of claim 2, wherein said features include diffusion dots, predetermined scratches, indentations, grooves, protrusions, regular or irregular undulations and the like.

4. The method of claims 2, further comprising:
   distributing said features with an increasing density as a function of distance from a light source.

5. The method of claim 4, wherein said function is quadratic.

6. The method of claim 1, further comprising:
   locating an at least one light source along said peripheral boundary.

7. The method of claim 6, wherein said light source is a cold cathode fluorescent tube.

8. The method of claim 6, wherein said light source is an array of light emitting diodes.

9. The method of claim 1, further comprising:
   configuring said emissive layer to refract the ray axis of light at the said peripheral boundary such that the peripheral boundary between adjacent screens is not visible along said viewer's sightline.

10. The method of claim 1, wherein the said prescribed thickness of the emissive sheet is reduced as a function of distance from a said light source.

11. The method of claim 1, further comprising:
    forming said emissive layer from a light guide.

12. A visual display unit, comprising:
    two or more at least partially overlapping display screens located in distinct focal planes, at least one said screen being at least partially transparent, wherein an at least partially transparent emissive layer is provided between said screens, wherein said emissive layer is configured for providing light to said screens, and wherein said emissive layer is a sheet with substantially planar opposed upper and a lower surfaces and a peripheral boundary of a prescribed thickness, said sheet formed from a material such that light rays incident from said peripheral boundary are retained between the said planar surface through total internal refraction at angles less than a critical angle.

13. The visual display unit of claim 12, wherein at least one said sheet planar surface has a plurality of defined features located thereupon capable of refracting a said retained light ray incident on a said feature through an angle greater than the said critical angle of total internal reflection sufficient to exit said sheet via one of said planar surfaces.

14. The visual display unit of claim 13, wherein said features include diffusion dots, predetermined scratches, indentations, grooves, protrusions, regular or irregular undulations and the like.

15. The visual display unit of claim 13, wherein the said features are distributed with an increasing density as a function of distance from a light source.

16. The visual display unit of claim 15, wherein said function is quadratic.

17. The visual display unit of claim 12, wherein at least one light source is located along said peripheral boundary.

18. The visual display unit of claim 17, wherein said light source is a cold cathode fluorescent tube.

19. The visual display unit of claim 17, wherein said light source is an array of light emitting diodes.

20. The visual display unit of claim 12, wherein said emissive layer is configured to refract the ray axis of light at the said peripheral boundary such that the peripheral boundary between adjacent screens is not visible along said viewer's sightline.

* * * * *